United States Patent
Lindén

(10) Patent No.: US 11,061,471 B2
(45) Date of Patent: Jul. 13, 2021

(54) SCREEN ESTIMATION

(71) Applicant: Tobii AB, Danderyd (SE)

(72) Inventor: Erik Lindén, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 16/710,686

(22) Filed: Dec. 11, 2019

(65) Prior Publication Data

US 2020/0225743 A1 Jul. 16, 2020

(30) Foreign Application Priority Data

Dec. 11, 2018 (SE) .................... 1851540-3

(51) Int. Cl.
  *G06F 3/13* (2006.01)
  *G06F 3/01* (2006.01)
  *G06T 7/73* (2017.01)
  *G06T 7/246* (2017.01)
  *G06F 17/16* (2006.01)

(52) U.S. Cl.
  CPC .............. *G06F 3/013* (2013.01); *G06F 3/017* (2013.01); *G06F 17/16* (2013.01); *G06T 7/251* (2017.01); *G06T 7/75* (2017.01)

(58) Field of Classification Search
  CPC ...................................... G06F 3/013
  USPC ....................................... 715/863
  See application file for complete search history.

(56) References Cited

U.S. PATENT DOCUMENTS

| | | | |
|---|---|---|---|
| 2005/0175218 A1* | 8/2005 | Vertegaal | A61B 3/113 382/103 |
| 2006/0110008 A1* | 5/2006 | Vertegaal | G06T 7/251 382/103 |
| 2012/0154441 A1* | 6/2012 | Kim | G06F 3/147 345/633 |
| 2017/0290504 A1* | 10/2017 | Khaderi | A61B 5/369 |
| 2018/0074581 A1* | 3/2018 | Melman | G06F 3/013 |
| 2018/0308252 A1* | 10/2018 | Alonso | G06F 3/0304 |
| 2020/0174560 A1* | 6/2020 | Park | G06T 19/006 |
| 2020/0174596 A1* | 6/2020 | Cohen | G06F 3/0416 |
| 2020/0202567 A1* | 6/2020 | Fitzgibbon | G06T 7/80 |
| 2020/0225743 A1* | 7/2020 | Linden | G06F 3/013 |

* cited by examiner

*Primary Examiner* — Reza Nabi
(74) *Attorney, Agent, or Firm* — Samuel I. Yamron

(57) ABSTRACT

The present invention relates to a method for establishing the position of an object in relation to a camera in order to enable gaze tracking with a user watching the object, where the user is in view of the camera. The method comprises the steps of showing a known pattern, consisting of a set of stimulus points $(s_1, s_2, \ldots, s_N)$, on the object, detecting gaze rays $(g_1, g_2, \ldots, g_N)$ from an eye of the user as the user looks at the stimulus points $(s_1, s_2, \ldots, s_N)$, and finding, by means of an optimizer, a position and orientation of the object in relation to the camera such that the gaze rays $(g_1, g_2, \ldots, g_N)$ approaches the stimulus points $(s_1, s_2, \ldots, s_N)$.

16 Claims, 1 Drawing Sheet

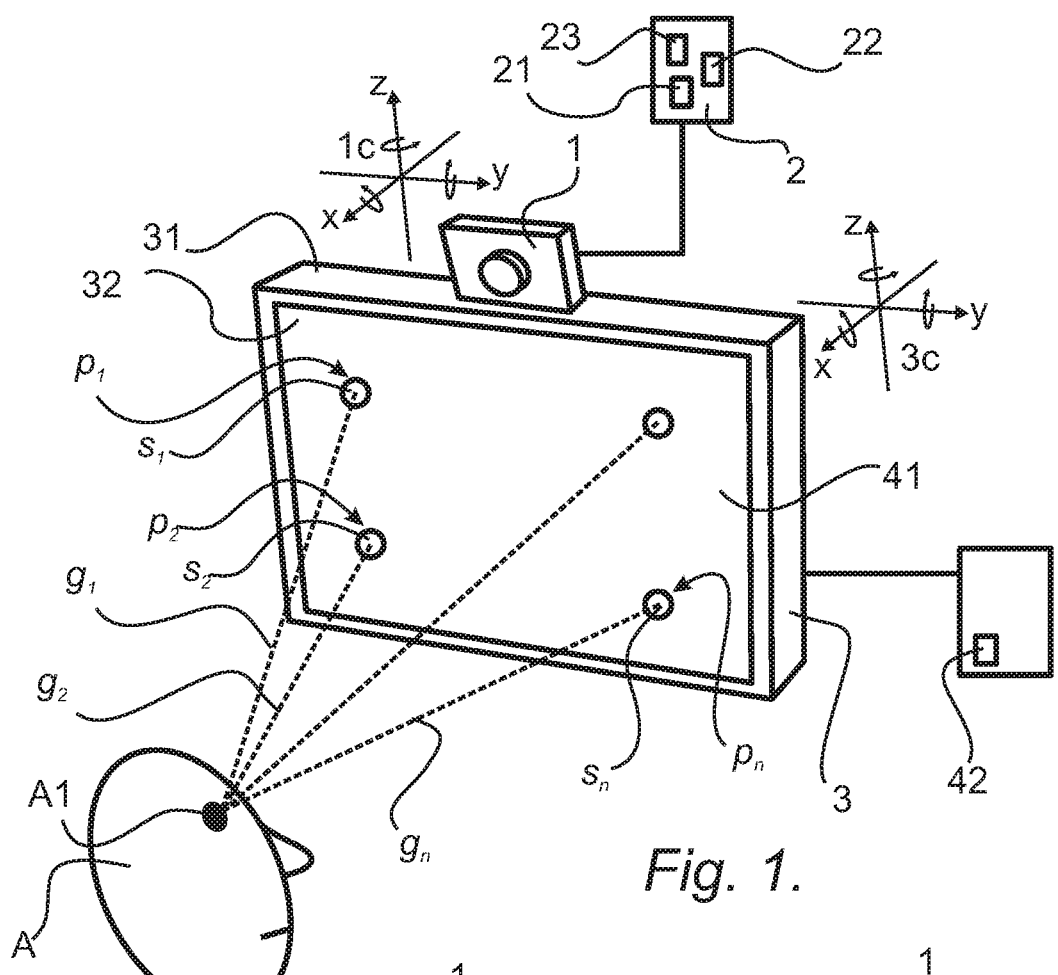
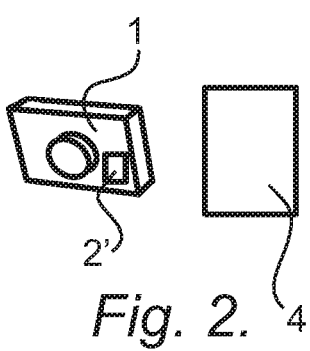
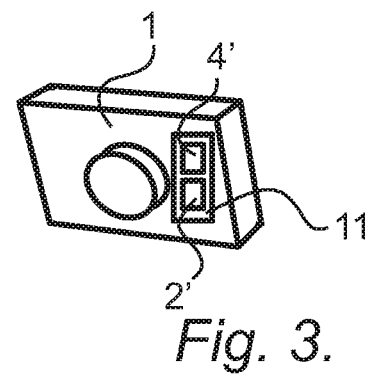
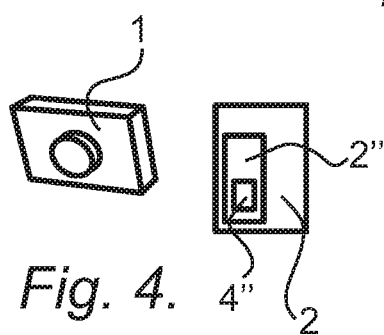
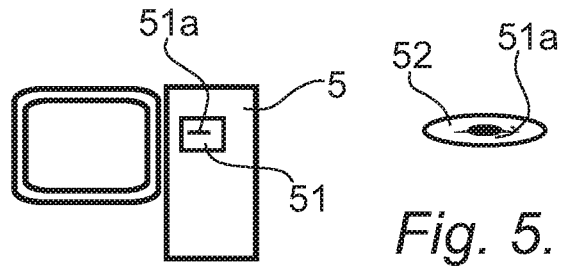

SCREEN ESTIMATION

CROSS-REFERENCES TO RELATED APPLICATIONS

This application claims priority to Swedish Application No. 1851540-3, filed Dec. 11, 2018; the content of which are hereby incorporated by reference.

TECHNICAL FIELD

The present invention relates to a method for establishing the position of an object in relation to a camera in order to enable gaze tracking with a user watching the object, where the user is in view of the camera.

The present invention also relates to a system through which it is possible to establishing the position of an object in relation to a camera in order to enable gaze tracking.

The present invention also relates to a computer program system through which the inventive method can be realized when executed on a computer, and to a computer readable medium upon which inventive computer program code is stored.

BACKGROUND ART

It is known to follow the movement of a user's eye and to use gaze rays or gaze tracking to track the position of where the user is looking at an object. The camera position in relation to the object is specified as an important parameter in a systems where gaze tracking is used.

If the object is a screen then the camera is either an integrated part of the screen with a defined and well known position in relation to the screen, or the camera is integrated with a fixture through which the camera can be positioned on a screen and which dictates the position of the camera in relation to the screen.

SUMMARY OF THE PRESENT INVENTION

Problems

The position of an object in relation to the camera need to be known in order to enable gaze tracking. There are many situations where the position of the object in relation to the camera is not known, and the typical situation is when the user has a separate web camera that is placed in an undefined or not specified position in relation to the object.

It is a technical problem to establish the position of a object in relation to a camera where the configuration of the camera and object does not dictate the position of the camera in relation to the object.

It is also a technical problem to perform a personal calibration of an eye model for a user where the configuration of the camera and object does not dictate the position of the camera in relation to the object.

Solution

With the purpose of solving one or several of the above mentioned problems, and on the basis of prior art such as it has been shown above and the indicated technical field, the present invention teaches that a method for establishing the position of an object in relation to a camera in order to enable gaze tracking with a user watching the object, where the user is in view of the camera, comprises the steps of:

showing a known pattern, consisting of a set of stimulus points, on the object;
detecting gaze rays from an eye of the user as the user looks at the stimulus points; and
finding, by means of an optimizer, a position and orientation of the object in relation to the camera such that the gaze rays approaches the stimulus points.

It is proposed that optimization performed by the optimizer comprises the steps of:
displaying a set of points, $(s_1, s_2, \ldots, s_N)$ on the object, where the position of the points on the object is known;
calculating the 3D position $(p_1, p_2, \ldots, p_N)$ of the points $(s_1, s_2, \ldots, s_N)$ in an object-fixed coordinate system;
predicting gaze rays $(g_1, g_2, \ldots, g_N)$ from a user as the user looks at the points $(s_1, s_2, \ldots, s_N)$ by means of a camera/eye-tracker in a camera coordinate system; and
transforming positions $(p_1, p_2, \ldots, p_N)$ in the object fixed coordinate system into the camera coordinate system by means of a translation vector t and a rotation matrix R.

The translation vector t and the rotation matrix R can be found by minimizing the loss function L:

$$L(t, R) = \sum_{i=1}^{N} \text{loss}(\text{line\_point\_distance}(g_i, R \times (p_i + t)))$$

where the position $p_i$ of an object points $s_i$ is translated and rotated into a position $pc_i$ in the camera coordinate system.

It is proposed that the line_point_distance is calculated as the distance between an object point $s_i$ on the object and a position where a gaze ray $g_i$ directed to the object point $s_i$ intersects the object.

An alternative solution to calculating the distance of a point to a line is that the formulation for the distance of a point to a line:

$$\text{line\_point\_distance}(x=a+nd, p) = \|(a-p) - ((a-p) \cdot n)n\|$$

is used to calculate the line_point_distance, where a gaze ray (g) is represented by the line x=a+nd, where a is a position of a point on the line, where n is a unit vector in the direction of the line, and where x gives the locus of the line as the scalar d varies, and where p is the calculated 3D position of a displayed points.

Any regression loss function, such as L1-loss, L2-loss or Huber-loss, can be used for the calculation of the loss, and a nonlinear optimizer, such as Levenberg-Marquardt, L-BFGS or Gauss-Newton, can be used for the optimizer.

The invention proposes that the size of the object is known, and that the field of view for the camera is known.

With the purpose of reducing the complexity or increasing the accuracy of the optimization process it is proposed that one or several constraints to the position of the object in relation to the camera are introduced, such as:
that the camera is on top of the object, meaning it cannot be above or below a defined top surface of the object; and/or
that the camera is at the same distance from the person as the object, meaning that it cannot be in front of, or behind, a defined front surface of the object; and/or
that the camera has zero yaw and zero roll in the object fixed coordinate system.

The present invention can be implemented in any situation where gaze tracking is to be used on any kind of object. One common situation where gaze tracking is used is where the object is a display screen. In this situation the stimulus points are displayed on the screen, and the screen surface of the screen defines the object fixed coordinate system.

The present invention also relates to a method used to calibrate the eye model for a user in a gaze tracking application, where the user is watching an object in view of a camera. It is proposed that the position of the object in relation to the camera is established according to the disclosed inventive method for establishing the position of an object in relation to a camera, and that the hereby established object position is used in the calibration.

According to an alternative embodiment of the present invention it is proposed to use an eye model for the calculation of a gaze ray g according to:

$$g = \text{eye\_model}(e, c)$$

where e is an image from the camera showing what the camera sees, including an eye of the user, as the user is watching an object, and where c is a personal calibration for the user. It is proposed that the eye_model(e, c) is introduced into the loss function L so that:

$$L(c, R, t) = \sum_{i=1}^{N} \text{loss}(\text{line\_point\_distance}(\text{eye\_model}(e_i, c), R \times (p_i + t)))$$

whereby the simultaneous establishment of the position of the object in relation to the camera and the personal calibration c of the eye model is enabled.

It is also proposed that a penalty function P(c, R, t) is introduced into the loss function L so that:

$$L(c, R, t) = \\ \sum_{i=1}^{N} \text{loss}(\text{line\_point\_distance}(\text{eye\_model}(e_i, c), R \times (p_i + t))) + P(c, R, t)$$

A penalty function can take many different forms, where one proposed form is the use of a penalty function that punish personal calibrations c that deviates substantially from typical values from a known population.

The present invention also relates to a system comprising an object, a camera and at least a first computer unit, where the first computer unit is adapted to establish the position of the object in relation to the camera in order for the first computer unit to enable gaze tracking with a user watching the object, where the user is in view of the camera.

It is proposed that the first computer unit is adapted to show a known pattern, consisting of a set of stimulus points, on the object, that the first computer unit is adapted to detect gaze rays from an eye of the user as the user looks at the stimulus points, and that the first computer unit comprises an optimizer, which optimizer is adapted to find a position and orientation of the object in relation to the camera such that the gaze rays approaches the stimulus points.

It is proposed that a second computer unit is adapted to display a set of points, $(s_1, s_2, \ldots, s_N)$ on the object, where the position of the points on the object is known to the first computer unit and to the optimizer, and that the optimizer is adapted to calculate the 3D position $(p_1, p_2, \ldots, p_N)$ of the points $(s_1, s_2, \ldots, s_N)$ in an object-fixed coordinate system. The system comprises a camera/eye tracker, which can be adapted to predict gaze rays $(g_1, g_2, \ldots, g_N)$ from a user as the user looks at the points $(s_1, s_2, \ldots, s_N)$ in a camera coordinate system, and the optimizer can be adapted to transform positions $(p_1, p_2, \ldots, p_N)$ in the object fixed coordinate system into the camera coordinate system by means of a translation vector t and a rotation matrix R.

It is further proposed that the optimizer is adapted to find the translation vector t and the rotation matrix R by minimizing the loss function L:

$$L(t, R) = \sum_{i=1}^{N} \text{loss}(\text{line\_point\_distance}(g_i, R \times (p_i + t)))$$

where the position $p_i$ of an object point $s_i$ is translated and rotated into a position $pc_i$ in the camera coordinate system.

The invention teaches that the optimizer can be adapted to calculate the line_point_distance as the distance between an object point $s_i$ on the object and a position where a gaze ray $g_i$ directed to the object point $s_i$ intersects the object.

An alternative proposed solution is that the optimizer can be adapted to use the formulation for the distance of a point to a line:

$$\text{line\_point\_distance}(x = a + nd, p) = \|(a - p) - ((a - p)n\|$$

for the calculation of the line_point_distance, where a gaze ray (g) is represented by the line x=a+nd, where a is a position of a point on the line, where n is a unit vector in the direction of the line, and where x gives the locus of the line as the scalar d varies, and where p is the calculated 3D position of a displayed point s.

It is also proposed that the optimizer can be adapted to use any regression loss function, such as L1-loss, L2-loss or Huber-loss, for the calculation of the loss, and that the optimizer can be adapted to function as a nonlinear optimizer, such as Levenberg-Marquardt, L-BFGS or Gauss-Newton.

It is proposed that the size of the object, and the field of view for the camera, is known to the first computer unit.

With the purpose of simplifying or increasing the accuracy of the optimizer it is proposed that at least one constraint to the position of the object in relation to the camera is known, such as:
- that the camera is on top of the object, meaning it cannot be above or below a defined top surface of the object; and/or
- that the camera is at the same distance from the person as the object, meaning that it cannot be in front of, or behind, a defined front surface of the object; and/or
- that the camera has zero yaw and zero roll in the object fixed coordinate system.

According to one proposed embodiment, the system comprises a display screen, where the display screen is the object. According to this embodiment it is proposed that the first computer unit is adapted to provide instructions to a second computer unit on how to display the stimulus points, that a graphics output unit belonging to the second computer unit is adapted to display the stimulus points on the screen, and that the screen surface of the screen defines the object fixed coordinate system.

It is proposed that, where the system is adapted to provide a gaze tracking application for the user while watching the object in view of the camera, the first computer unit comprises a calibrating unit adapted to calibrate the eye model for the user in the gaze tracking application.

This calibration can be performed in different ways, and according to one proposed embodiment it is proposed that the calibrating unit is adapted to use the object position established by the optimizer in the calibration.

Another proposed embodiment teaches that the calibrating unit is adapted to calibrate the eye model for the user by means of an eye model for the calculation of a gaze ray g according to:

$$g = \text{eye\_model}(e, c)$$

where e is an image from the camera showing what the camera sees, including an eye of the user, as the user is watching an object, and where c is a personal calibration for the user. It is then proposed that the optimizer is adapted to introduce the eye_model(e, c) into the loss function L so that the optimizer is can find the translation vector t, the rotation matrix R and the personal calibration c by minimizing the loss function L:

$$L(c, R, t) = \sum_{i=1}^{N} \text{loss}\left(\text{line\_point\_distance}(\text{eye\_model}(e_i, c), R \times (p_i + t))\right)$$

thereby enabling the optimizer to establish the position of the object in relation to the camera and the personal calibration c of the eye model simultaneously.

It is also proposed that the optimizer is adapted to introduce a penalty function P(c, R, t) into the loss function L so that:

$$L(c, R, t) =$$

$$\sum_{i=1}^{N} \text{loss}(\text{line\_point\_distance}(\text{eye\_model}(e_i, c), R \times (p_i + t))) + P(c, R, t)$$

where the penalty function can take many different forms, such as a function that punish personal calibrations c that deviates substantially from typical values from a known population.

The present invention also relates to a computer program product comprising computer program code which, when executed by a computer, enables the computer to function as a previously disclosed optimizer.

The present invention also relates to a computer readable medium upon which inventive computer program code is stored.

Advantages

The advantages that foremost may be associated with a method, system or computer program product according to the present invention are that gaze tracking is enabled even in systems or application where the camera position in relation to the object is not specified.

BRIEF DESCRIPTION OF THE DRAWINGS

A system having the properties associated with the present invention will now be described in more detail for the purpose of exemplifying, reference being made to the accompanying drawing, wherein:

FIG. 1 shows schematically and very simplified a method and system according to the invention, FIG. 2 shows schematically and very simplified a first alternative relation between computer units, FIG. 3 shows schematically and very simplified a second alternative relation between computer units, FIG. 4 shows schematically and very simplified a third alternative relation between computer units, and FIG. 5 shows schematically a computer program product and computer readable medium according to the present invention.

DETAILED DESCRIPTION OF PREFERRED EMBODIMENTS

In the following, the present invention will be described, where FIG. 1 shows a schematic illustration of a camera 1 connected to a computer unit 2, where a user A is watching an object 3, and where the user A, or at least an eye A1 of the user A, is in view of the camera 1.

The relative position between the object 3 and the camera 1 is not known and this position needs to be known in order to enable gaze tracking for the user A as the user A is watching the object 3.

For the sake of simplicity a camera coordinate system 1c and an object-fixed coordinate system 3c are defined, where these coordinate systems are defined from the position of a user as follows:

the x-axis of both coordinate systems is an axis that is pointing from the camera and object respectively towards the user, where a roll is a rotation of the camera or object around the x-axis, the y-axis of both coordinate systems is a horizontal axis pointing from left to right seen from the user, where a pitch is a rotation of the camera or object around the y-axis, and the z-axis of both coordinate systems is a vertical axis pointing upwards as seen from the user, where a yaw is a rotation of the camera or object around the z-axis.

The invention proposes a method for establishing the position of the object 3 in relation to the camera 1 in order to enable gaze tracking for the user A. The inventive method comprises the steps of:

showing a known pattern, consisting of a set of stimulus points $s_1, s_2, \ldots, s_N$, on the object 3;

detecting gaze rays $g_1, g_2, \ldots, g_N$ from an eye A1 of the user A as the user looks at the stimulus points $s_1, s_2, \ldots, s_N$; and finding, by means of an optimizer 21, a position and orientation of the object 3 in relation to the camera 1 such that the gaze rays $g_1, g_2, \ldots, g_N$ approaches the stimulus points $s_1, s_2, \ldots, s_N$.

Through the known pattern of stimulus points, the detected gaze rays, and an assumption that the 3D information is reliable, it is possible to find an object position and orientation such that the gaze rays approaches the shown stimulus points One proposed way of perform the optimization by the optimizer 21 comprises the steps of:

displaying a set of points, $s_1, s_2, \ldots, s_N$ on the object 3, where the position of the points on the object 3 is known;

calculating the 3D position $p_1, p_2, \ldots, p_N$ of the points $s_1, s_2, \ldots, s_N$ in an object-fixed coordinate system 3c;

predicting gaze rays $g_1, g_2, \ldots, g_N$ from a user as the user looks at the points $s_1, s_2, \ldots, s_N$ by means of a camera/eye-tracker 22 in a camera coordinate system 1c; and transforming positions $(p_1, p_2, \ldots, p_N)$ in the object fixed coordinate system 3c into the camera coordinate system 1c by means of a translation vector t and a rotation matrix R.

The inventive method teaches that the translation vector t and the rotation matrix R can be found by minimizing the loss function L:

$$L(t, R) = \sum_{i=1}^{N} \text{loss}(\text{line\_point\_distance}(g_i, R \times (p_i + t)))$$

where the position $p_i$ of an object point $s_i$ in the object-fixed coordinate system $3c$ is translated and rotated into a position $pc_i$ in the camera coordinate system $1c$.

The proposed function L can be realized in different ways.

One proposed embodiment teaches that the line_point_distance is calculated as the distance between an object point $s_i$ on the object 3 and a position where a gaze ray $g_i$ directed to the object point $s_i$ intersects the object 3.

Another proposed embodiment teaches that the formulation for the distance of a point to a line:

line_point_distance$(x=a+nd, p) = \|(a-p)-((a-p)\cdot n)n\|$ is used to calculate the line_point_distance, where a gaze ray (g) is represented by the line x=a+nd, where a is a position of a point on the line, where n is a unit vector in the direction of the line, and where x gives the locus of the line as the scalar d varies, and where p is the calculated 3D position of a displayed points.

It is also proposed that any regression loss function, such as L1-loss, L2-loss or Huber-loss, can be used for the calculation of the loss, and that any nonlinear optimizer, such as Levenberg-Marquardt, L-BFGS or Gauss-Newton, can be used for the optimizer 21.

It should be understood that the size of the object 3 is known, and that the field of view for the camera 1 is known.

In the simplest case, the optimization problem has 6 degrees of freedom, which are 3 degrees for translation, that is:
  a translation of the camera 1 to the left or right in relation to the object 3, or along the y-axis in the object-fixed coordinate system $3c$,
  a translation of the camera 1 up or down in relation to the object 3, or along the z-axis in the object-fixed coordinate system $3c$, and
  a translation of the camera 1 forwards or backwards in relation to the object 3, or along the x-axis in the object-fixed coordinate system $3c$,
and 3 degrees for rotation, that is:
  pitching the camera 1 up or down in relation to the object 3, or a rotation of the camera 1 around the y-axis in the object-fixed coordinate system $3c$,
  yawing the camera 1 to the left or right in relation to the object 3, or a rotation of the camera along the z-axis in the object-fixed coordinate system $3c$, and
  rolling the camera 1 to the left or right in relation to the object 3, or a rotation of the camera 1 around the x-axis in the object-fixed coordinate system $3c$.

It is however possible to apply various constraint to the position of the object in relation to the camera, such as:
  that the camera 1 is on top of the object 3, meaning that it is fixed in one position along the z-axis of the object-fixed coordinate system $3c$, such as that it cannot be above or below a defined horizontal position, such as the top surface 31 of the object; and/or
  that the camera 1 is at the same distance from the person A as the object 3, meaning that it is fixed in one position along the x-axis of the object-fixed coordinate system $3c$, such as that it cannot be in front of, or behind, a defined front surface 32 of the object; and/or
  that the camera 1 has zero yaw, meaning that it has no rotation around the z-axis in the object-fixed coordinate system $3c$, and that the camera has zero roll, meaning that it has no rotation around the x-axis in the object-fixed coordinate system $3c$, such as that a plane defined by the x-axis and z-axis of the camera coordinate system $1c$ is parallel to a plane defined by the x-axis and the z-axis of the object fixed coordinate system $3c$. These constraints will reduce the complexity and/or increase the accuracy of the optimization process.

Gaze tracking can be used for many different kinds of objects and the present invention can be used with, and adapted to, any kind of object. In many applications where gaze tracking is used something is displayed on a screen, in which case the object itself would be some kind of a screen or display, which is also used as example in the figures. It should be understood that even though all the points generated on a flat object as that of a screen are in a mutual plane, the plane of the screen, it is not required by the present invention that the points are in positioned in a mutual plane, hence, the present invention will function in a situation where the points are points on any 3-dimensional object, or in any coordinate system $3c$, where the invention will enable the establishment of the position of the points in relation to the camera coordinate system $1c$.

However, in an embodiment where the object 3 is a display screen 41, then the invention teaches that the stimulus points can be displayed on the screen 41, and that the screen surface of the screen 41 defines the object fixed coordinate system $3c$.

Gaze tracking sometimes include personal calibration for the user of the gaze tracking application.

In a general model for gaze tracking, the eye tracking algorithm use an image e from the camera 1, which image e shows what the camera sees as the user is watching an object, which object can be something abstract and not defined. The image e shows the eye of the user and from this image a gaze ray g can be calculated.

Let g(d)=a+nd represent a gaze ray passing through point a where n is a unit vector in the direction of the gaze ray g, and where different d gives different positions on the gaze ray.

What the eye tracking algorithm can see is not sufficient to calculate the gaze ray g, a personal calibration c for the user is also required. The two values e and c are combined with an eye_model( ) to calculate the gaze ray:

$g$=eye_model$(e,c)$

It should be understood that e does not need to be a single image, it can be a collection of several images were the eye_model uses information from multiple images to predict one gaze ray. One example of using several images for the eye_model is to use multiple images to filter out noise.

With a number N of sample pairs $(e_i, p_i)$ where i is a sample, the previously shown loss function L could be:

$$L(c, R, t) = \sum_{i=1}^{N} \text{loss}(\text{line\_point\_distance}(\text{eye\_model}(e_i, c), R \times (p_i + t))) + P(c, R, t)$$

where an optional penalty function P(c, R, t) has been added. A penalty function can take many different forms but a typical choice would be to punish personal calibrations c that deviates substantially from typical values from a known population.

The user A is asked to gaze a set of known stimulus points and then an eye tracker 22 computes a personal calibration problem by solving an optimization problem. The optimization problem is to find a set of personal parameters that minimizes the miss distance between the gaze rays and the known points, similar to the cost function as show above relating to establishing the position of an object 3 in relation to a camera 1 in order to enable gaze tracking.

There are typically three personal parameters per eye, two parameters that angles the gaze up/down and left/right and one parameter that increases/decreases the angle between the eye-camera vector and the gaze ray.

In the scenario described above, calibration is not possible, since the location of the object is not known and thus the true location of the shown stimulus points are not known. The present invention proposes a method to calibrate the eye model for a user A in a gaze tracking application where the user A is watching an object 3 in view of a camera 1, where the position of the object 3 in relation to the camera 1 is established according to the inventive disclosed method for establishing a position of an object in relation to a camera, or in short, the object position in relation to the camera can be solved according to:

$$R, t = \underset{R,t}{\operatorname{argmin}} L(c0, R, t)$$

where the personal calibration c is not part of the problem and can be left out, or where c0 is a population mean value for the personal calibration c.

After that the thus established object position can be used in the personal calibration, where the calibration can be calculated according to:

$$c = \underset{c}{\operatorname{argmin}} L(c, R, t)$$

where R and t are known from the previous establishment of the position of the object in relation to the camera.

It is also possible to find the position of the object in relation to the camera and the personal calibration simultaneously according to:

$$c, R, t = \underset{c,R,t}{\operatorname{argmin}} L(c, R, t)$$

This will probably result in a problem that is underdetermined, and with the purpose of obtaining a problem that is determined it is proposed that one or more constraints as previously described are introduced, and/or that constraints on personal parameters pertaining to the user are introduced through the use of the penalty function P(c, R, t), where such a penalty function could be that one or more of the personal parameters must be close to the population mean as previously described.

With renewed reference to FIG. 1 it is shown that the present invention also relates to a system comprising a camera 1, at least a first computer unit 2, and an object 3, where the first computer unit 2 is adapted to establish the position of the object 3 in relation to the camera 1 in order for the first computer unit 2 to enable gaze tracking with a user A watching the object 3, where the user A is in view of the camera 1.

A second computer unit 4 is adapted to show a known pattern, consisting of a set of stimulus points $s_1, s_2, \ldots, s_N$, on the object 3, and a camera/eye-tracker 22 is adapted to detect gaze rays $g_1, g_2, \ldots, g_N$ from an eye A1 of the user A as the user looks at the stimulus points $s_1, s_2, \ldots, s_N$. The first computer unit 2 comprises an optimizer 21, which optimizer 21 is adapted to find a position and orientation of the object 3 in relation to the camera 1 such that the gaze rays $g_1, g_2, \ldots, g_N$ approaches the stimulus points $s_1, s_2, \ldots, s_N$.

A second computer unit 4 is adapted to display a set of points, $s_1, s_2, \ldots, s_N$ on the object 3, and the position of the points $s_1, s_2, \ldots, s_N$ on the object 3 is known to the first computer unit 2 and to the optimizer 21.

The optimizer 21 is adapted to calculate the 3D position $p_1, p_2, \ldots, p_N$ of the points $s_1, s_2, \ldots, s_N$ in an object-fixed coordinate system 3c, and the system comprises a camera/eye tracker 22, which is adapted to predict gaze rays $g_1, g_2, \ldots, g_N$ from a user A as the user A looks at the points $s_1, s_2, \ldots, s_N$ in a camera coordinate system. The optimizer 21 is adapted to transform positions ($p_1, p_2, \ldots, p_N$) in the object fixed coordinate system 3c into the camera coordinate system 1c by means of a translation vector t and a rotation matrix R.

The optimizer is adapted to find the translation vector t and the rotation matrix R by minimizing the loss function L:

$$L(t, R) = \sum_{i=1}^{N} \operatorname{loss}(\operatorname{line\_point\_distance}(g_i, R \times (p_i + t)))$$

where the position $p_i$ of an object point $s_i$ is translated and rotated into a position $pc_i$ in the camera coordinate system 1c.

It is proposed that the optimizer 21 is adapted to calculate the line_point_distance as the distance between an object point $s_i$ on the object 3 and a position where a gaze ray $g_i$ directed to the object point $s_i$ intersects the object 3.

According to an alternative embodiment of the present invention it is proposed that the optimizer 21 is adapted to use the formulation for the distance of a point to a line:

$$\operatorname{line\_point\_distance}(x=a+nd, p) = \|(a-p)-((a-p)\cdot n)n\|$$

for calculating the line_point_distance, where a gaze ray (g) is represented by the line x=a+nd, where a is a position of a point on the line, where n is a unit vector in the direction of the line, and where x gives the locus of the line as the scalar d varies, and where p is the calculated 3D position of a displayed points.

It is also proposed that the optimizer 21 is adapted to use any regression loss function, such as L1-loss, L2-loss or Huber-loss, for the calculation of the loss, and to function as a nonlinear optimizer, such as Levenberg-Marquardt, L-BFGS or Gauss-Newton.

The size of the object 3, and the field of view for the camera 1, is known to the first computer unit 2.

It is proposed that at least one constraint to the position of the object 3 in relation to the camera 1 is known, such as:
that the camera 1 is on top of the object 3, meaning that it is fixed in one position along the z-axis of the object-fixed coordinate system 3c, such as that it cannot be above or below a defined top surface 31 of the object; and/or
that the camera 1 is at the same distance from the person A as the object 3, meaning that it is fixed in one position along the x-axis of the object-fixed coordinate system 3c, such as that it cannot be in front of, or behind, a defined front surface 32 of the object; and/or that the camera 1 has zero yaw, meaning that it has no rotation around the z-axis in the object-fixed coordinate system 3c, and that the camera has zero roll, meaning that it has no rotation around the x-axis in the object-fixed coordinate system 3c, such as that a plane defined by the x-axis and z-axis of the camera coordinate system 1c is parallel to a plane defined by the x-axis and the z-axis of the object fixed coordinate system 3c.

The inventive system may comprise a second computer unit 4 with a display screen 41, where the display screen itself is the object 3. It is proposed that the first computer unit 2 may be adapted to provide instructions to the second computer unit 4 on how to display the stimulus points, and that a graphics output unit 42, belonging to the second computer unit 4, may be adapted to display the stimulus points on the screen 41, where the screen surface of the screen 3 defines the object fixed coordinate system 3c.

The system is adapted to provide a gaze tracking application for the user A while watching the object 3 in view of the camera 2, and it is proposed that the system comprises a calibrating unit 23 which is adapted to calibrate the eye model for the user A in the gaze tracking application. There are different ways of performing a calibration and one proposed embodiment teaches that the calibrating unit 23 is adapted to use the object position established by the optimizer 21 in the calibration.

According to an alternative embodiment for calibration it is proposed that the calibrating unit 23 is adapted to calibrate the eye model for the user A by means of an eye model for the calculation of a gaze ray g according to:

$$g = \text{eye\_model}(e, c)$$

where e is an image from the camera 1 showing what the camera 1 sees, including an eye A1 of the user A, as the user A is watching an object 3, and where c is a personal calibration for the user. The optimizer 21 can then be adapted to introduce the eye_model(e, c) into the loss previously mentioned function L, so that the optimizer can find the translation vector t, the rotation matrix R and the personal calibration c by minimizing the loss function L:

$$L(c, R, t) = \sum_{i=1}^{N} \text{loss}(\text{line\_point\_distance}(\text{eye\_model}(e_i, c), R \times (p_i + t)))$$

thereby enabling the optimizer to establish the position of the object 3 in relation to the camera 1 and the personal calibration c of the eye model simultaneously.

It is proposed that the optimizer 21 is adapted to introduce a penalty function P(c, R, t) into the loss function L so that:

$$L(c, R, t) = \sum_{i=1}^{N} \text{loss}(\text{line\_point\_distance}(\text{eye\_model}(e_i, c), R \times (p_i + t))) + P(c, R, t)$$

where the penalty function P(c, R, t) can take many different forms. A typical choice of penalty function is one that punish personal calibrations c that deviates substantially from typical values from a known population.

The first computer unit 2 according to disclosed embodiments in both the inventive method and system is a separate computer unit 2 connected to the camera 1. The second computer unit 4 is disclosed as a computer unit connected to, and adapted to control, the display unit 41.

However, it should be understood that the invention is not limited to this embodiment and that there are different embodiments where described computer units have mutually different relations.

FIG. 2 shows an embodiment where the first computer unit may be a first computer processor 2' enclosed within the camera 1 and the second computer unit 4 is still a separate computer unit connected to the object.

FIG. 3 shows an embodiment where the first computer unit is a first computer processor 2' enclosed within the camera 1 and the second computer unit is a second computer processor 4' enclosed within the camera 1. In this embodiment, one and the same computer processor 11 can take the function of both the first and second computer processor 2', 4'. If for example a computer with both a camera and screen is used by the user, but where the exact position of the camera in relation to the screen is not known, then it is possible that this computer would have the function of both the first and second computer unit.

FIG. 4 shows an embodiment where the second computer unit is a second computer processor 4" enclosed within said first computer unit 2. In this embodiment, one and the same computer processor 2" can take the function of both the first computer unit 2 and the second computer unit.

It is thus clear that the first computer unit 2 and the second computer unit 4 can be two separate computer units or that they can be one and the same computer unit being adapted to perform the function of both the first and the second computer unit.

FIG. 5 is a schematic illustration of an inventive computer program product 51 comprising computer program code 51a which, when executed by a computer 5, enables the computer to function as first computer unit 2, with an optimizer 21, as shown in the inventive method.

FIG. 5 also shows a non-volatile memory unit 52, here exemplified by a compact disc, upon which inventive computer program code 51a is stored.

The invention is not limited to the embodiments given above as examples but may be subjected to modifications within the scope of the general idea of the invention such as this is shown and defined in the subsequent claims.

The invention claimed is:

1. Method for establishing a position of an object in relation to a camera in order to enable gaze tracking with a user watching said object, where said user is in view of said camera, comprising:

showing a known pattern, consisting of a set of stimulus points ($s_1, s_2, \ldots, s_N$), on said object; and finding, by means of an optimizer, a position and orientation of said object in relation to said camera the optimizer performing the steps of:

calculating 3D positions ($p_1, p_2, \ldots, p_N$) of said points ($s_1, s_2, \ldots, s_N$) in an object-fixed coordinate system;

predicting gaze rays ($g_1, g_2, \ldots, g_N$) from the user as the user looks at said points ($s_1, s_2, \ldots, s_N$) by means of said camera, in a camera coordinate system; and transforming positions ($p_1, p_2, \ldots, p_N$) in said object fixed coordinate system into said camera coordinate system by means of a translation vector t and a rotation matrix R;

wherein the optimizer is configured to find the translation vector t and a rotation matrix R by minimizing the the loss function L:

$$L(t, R) = \sum_{i=1}^{N} \text{loss}(\text{line\_point\_distance}(g_i, R \times (p_i + t)))$$

where the position $p_i$ of an object point $s_i$ is translated and rotated into a position $pc_i$ in the camera coordinate system.

2. Method according to claim 1, further comprising using the formulation for the distance of a point to a line:

line_point_distance($x=a+nd,p$)=$\|(a-p)-((a-p)\cdot n)n\|$ is used to calculate said line_point_distance, where a gaze ray is represented by the line x=a+nd, where a is a position of a point on the line, where n is a unit vector in the direction of the line, and where x gives the locus of the line as the scalar d varies, and where p is the calculated 3D position of a displayed point s.

3. Method according to claim 1, further comprising the introduction of at least one constraint to the position of said object in relation to said camera, said at least one constraint being:

that said camera is on top of said object, meaning it cannot be above or below a defined horizontal position, such as the top surface, of said object;

that said camera is at the same distance from said person as said object, meaning that it cannot be in front of, or behind, a defined front surface of said object; or that said camera has zero yaw and zero roll in said object fixed coordinate system.

4. Method according to claim 1, further comprising that said object is a display screen, and that said stimulus points (s1, s2, ..., sn) are displayed on said screen, and that the screen surface of said screen defines said object fixed coordinate system.

5. Method according to claim 1, further comprising using an eye model for the calculation of a gaze ray g according to:

g=eye_model($e,c$)

where e is an image from said camera showing what said camera sees, including an eye of said user, as said user is watching an object, where c is a personal calibration for said user, introducing said eye_model(e, c) into said loss function L so that:

$$L(c, R, t) = \sum_{i=1}^{N} \text{loss}(\text{line\_point\_distance}(\text{eye\_model}(e_i, c), R \times (p_i + t)))$$

and thereby enabling the simultaneous establishment of the position of said object in relation to said camera and the personal calibration c of said eye model.

6. Method according to claim 5, further comprising introducing a penalty function P(c, R, t) into said loss function L so that:

$$L(c, R, t) = \sum_{i=1}^{N} \text{loss}(\text{line\_point\_distance}(\text{eye\_model}(e_i, c), R \times (p_i + t))) + P(c, R, t).$$

7. Method according to claim 6, further comprising the use of a penalty function P(c, R, t) that punish personal calibrations c that deviates substantially from typical values from a known population.

8. A non-transitory computer-readable storage medium storing instructions which, when executed by processing circuitry of a system, cause the system to perform the steps of claim 1.

9. System comprising an object, a camera, and at least a first computer unit, where said first computer unit is adapted to establish a position of said object in relation to said camera in order for said first computer unit to enable gaze tracking with a user watching said object, where said user is in view of said camera:

wherein a second computer unit that is adapted to show a known pattern, consisting of a set of stimulus points ($s_1, s_2, \ldots, s_N$), on said object, and wherein said first computer unit comprises an optimizer adapted to find a position and orientation of said object in relation to said camera and wherein the optimizer is further adapted to:

calculate a 3D position ($p_1, p_2, \ldots, p_N$) of said points ($s_1, s_2, \ldots, s_N$) in an object-fixed coordinate system;

predict, by means of said camera, gaze rays ($g_1, g_2, \ldots, g_N$) from the user as the user looks at said points ($s_1, s_2, \ldots, s_N$) in a camera coordinate system; and transform positions ($p_1, p_2, \ldots, p_N$) in said object fixed coordinate system into said camera coordinate system by means of a translation vector t and a rotation matrix R;

wherein the optimizer is configured to find the translation vector t and a rotation matrix R by minimizing the the loss function L:

$$L(t, R) = \sum_{i=1}^{N} \text{loss}(\text{line\_point\_distance}(g_i, R \times (p_i + t)))$$

where the position $p_i$ of an object point $s_i$ is translated and rotated into a position $pc_i$ in the camera coordinate system.

10. System according to claim 9 further comprising that said optimizer is adapted to calculate said line_point_distance as the distance between an object point $s_i$ on said object and a position where a gaze ray $g_i$ directed to said object point $s_i$ intersects said object.

11. System according to claim 9 further comprising that said optimizer is adapted to use the formulation for the distance of a point to a line:

line_point_distance($x=a+nd,p$)=$\|(a-p)-((a-p)\cdot n)n\|$ for calculating said line_point_distance, where a gaze ray (g) is represented by the line x=a+nd, where a is a position of a point on the line, where n is a unit vector in the direction of the line, and where x gives the locus of the line as a scalar d varies, and where p is the calculated 3D position of a displayed point s.

12. System according to claim 9, further comprising that at least one constraint to the position of said object in relation to said camera is known, said at least one constraint being:

that said camera is on top of said object, meaning it cannot be above or below a defined top surface of said object;

that said camera is at the same distance from said person as said object meaning that it cannot be in front of, or behind, a defined front surface of said object; or that said camera has zero yaw and zero roll in said object fixed coordinate system.

13. System according to claim 9, further comprising a display screen, that said display screen is said object, that said first computer unit is adapted to provide instructions to a second computer unit on how to display said stimulus points ($s_1, s_2, \ldots, s_N$), that a graphics output unit belonging to said second computer unit is adapted to display said stimulus points ($s_1, s_2, \ldots, s_N$) on said screen, and that a screen surface of said screen defines said object fixed coordinate system.

14. System according to claim 9, further comprising a display screen, that said first computer unit comprises a calibrating unit, that said system is adapted to provide a gaze tracking application for said user while watching said object in view of said camera, that said calibrating unit is adapted to calibrate the eye model for said user in said gaze tracking application, and that said calibrating unit is adapted to use the object position established by said optimizer in said calibration.

15. System according to claim 9, further comprising that said first computer unit comprises a calibrating unit, that said system is adapted to provide a gaze tracking application for said user while watching said object in view of said camera, that said calibrating unit is adapted to calibrate the eye model for said user by means of an eye model for the calculation of a gaze ray g according to:

$$g = \mathrm{eye\_model}(e, c)$$

where e is an image from said camera showing what said camera sees, including an eye of said user, as said user is watching an object, where c is a personal calibration for said user, that said optimizer is adapted to introduce said eye_model(e, c) into said loss function L so that said optimizer can find said translation vector t, said rotation matrix R and said personal calibration c by minimizing the loss function L:

$$L(c, R, t) = \sum_{i=1}^{N} \mathrm{loss}(\mathrm{line\_point\_distance}(\mathrm{eye\_model}(e_i, c), R \times (p_i + t)))$$

and that said optimizer thereby is enabled to establish the position of said object in relation to said camera and the personal calibration c of said eye model simultaneously.

16. System according to claim 15, further comprising that said optimizer is adapted to introduce a penalty function P(c, R, t) into said loss function L so that:

$$L(c, R, t) = \sum_{i=1}^{N} \mathrm{loss}(\mathrm{line\_point\_distance}(\mathrm{eye\_model}(e_i, c), R \times (p_i + t))) + P(c, R, t).$$

* * * * *